(12) United States Patent
Bettencourt et al.

(10) Patent No.: US 10,095,646 B2
(45) Date of Patent: Oct. 9, 2018

(54) DEVICE AND METHOD FOR ALLOWING INTEGRATION OF INCOMPATIBLE DEVICES INTO A VEHICLE BUS NETWORK

(71) Applicants: Harold Ray Bettencourt, Coos Bay, OR (US); Nicholas Ryan Bettencourt, North Bend, OR (US)

(72) Inventors: Harold Ray Bettencourt, Coos Bay, OR (US); Nicholas Ryan Bettencourt, North Bend, OR (US)

( * ) Notice: Subject to any disclaimer, the term of this patent is extended or adjusted under 35 U.S.C. 154(b) by 341 days.

(21) Appl. No.: 14/693,911

(22) Filed: Apr. 23, 2015

(65) Prior Publication Data

US 2015/0309949 A1  Oct. 29, 2015
US 2017/0371821 A9  Dec. 28, 2017

Related U.S. Application Data

(60) Provisional application No. 61/985,526, filed on Apr. 29, 2014.

(51) Int. Cl.
| | | |
|---|---|---|
| *G06F 13/38* | (2006.01) | |
| *G06F 11/30* | (2006.01) | |
| *G06F 13/42* | (2006.01) | |

(52) U.S. Cl.
CPC ........ *G06F 13/387* (2013.01); *G06F 11/3027* (2013.01); *G06F 13/4291* (2013.01)

(58) Field of Classification Search
CPC .................................................... G06F 13/387
See application file for complete search history.

(56) References Cited

U.S. PATENT DOCUMENTS

| | | | |
|---|---|---|---|
| 5,377,109 A | 12/1994 | Baker et al. | |
| 5,555,498 A * | 9/1996 | Berra | G06F 11/2733 |
| | | | 701/34.3 |
| 7,684,904 B2 | 3/2010 | Wainwright et al. | |
| 7,715,433 B2 | 5/2010 | Boren | |
| 7,821,439 B2 | 10/2010 | Replogle et al. | |
| 7,984,225 B2 | 7/2011 | McClure et al. | |
| 8,046,501 B2 | 10/2011 | Gormley | |
| 8,232,871 B2 | 7/2012 | Leseky | |
| 8,730,818 B2 | 5/2014 | Isaac et al. | |
| 8,788,139 B2 * | 7/2014 | Fedorchuk | H04L 67/12 |
| | | | 701/29.1 |
| 8,924,603 B2 | 12/2014 | McClure et al. | |
| 2005/0002417 A1 | 1/2005 | Kelly et al. | |
| 2005/0072608 A1 * | 4/2005 | Johnston | B60K 6/26 |
| | | | 180/65.245 |
| 2009/0204310 A1 * | 8/2009 | Gittere | G07C 5/008 |
| | | | 701/102 |
| 2010/0217479 A1 * | 8/2010 | Dahl | G07C 5/0808 |
| | | | 701/31.4 |

(Continued)

*Primary Examiner* — Farley Abad
(74) *Attorney, Agent, or Firm* — Jerry Haynes Law

(57) ABSTRACT

A device and method for communication among vehicle components operating on different electronic vehicle bus communication protocols is disclosed. The current invention is specifically designed with the capabilities and reliability required for permanent integration of an incompatible device into a vehicle bus network. This allows for installation and permanent integration of incompatible devices onto new and advanced vehicles which are manufactured using the latest electronic vehicle bus communication protocols.

19 Claims, 6 Drawing Sheets

(56) References Cited

U.S. PATENT DOCUMENTS

| | | | |
|---|---|---|---|
| 2011/0270485 A1* | 11/2011 | Jones | B60R 16/02 701/31.4 |
| 2012/0035804 A1* | 2/2012 | Roberts | G07C 5/0808 701/33.2 |
| 2013/0066514 A1* | 3/2013 | Das | G07C 5/008 701/31.5 |
| 2015/0088339 A1* | 3/2015 | Fisher | A61G 3/00 701/2 |

* cited by examiner

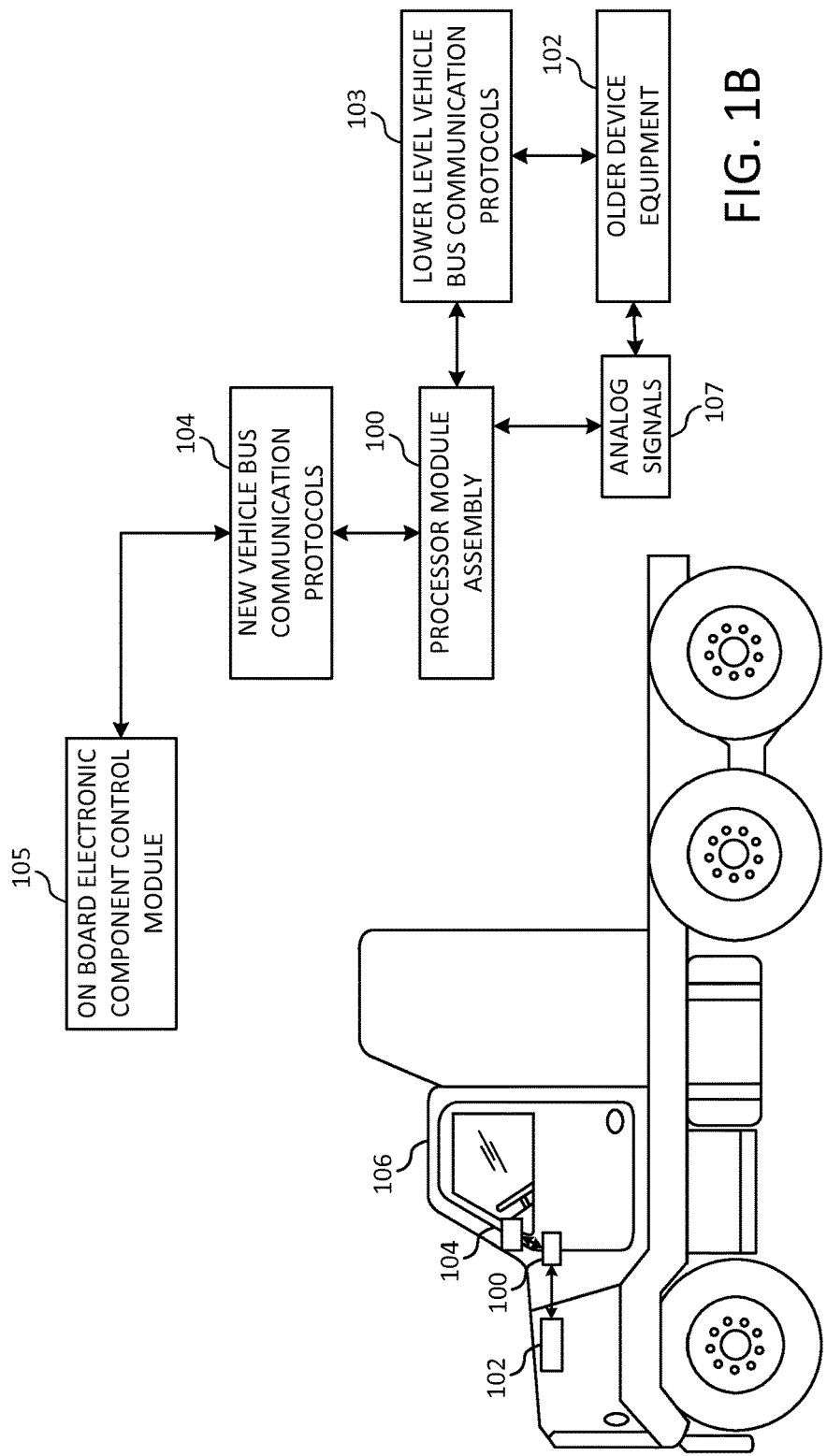

DEVICE AND METHOD FOR ALLOWING INTEGRATION OF INCOMPATIBLE DEVICES INTO A VEHICLE BUS NETWORK

CROSS-REFERENCES TO RELATED APPLICATIONS

This application claims priority from U.S. Provisional Application Ser. No. 61/985,526, entitled "Device and Method for Communication Between Vehicle Components Operating on Different Electronic Vehicle Bus Communication Protocols", filed Apr. 29, 2014, which application is hereby incorporated herein by reference in its entirety.

FIELD OF THE INVENTION

The present invention relates generally to a communication device and method for allowing communication among vehicle components and more particularly it relates to an intermediate communication device and method for allowing communication among vehicle components operating on different electronic vehicle bus communication protocols.

BACKGROUND OF THE INVENTION

As new vehicles are manufactured, they use the latest electronic vehicle bus communication protocols, such as SAE J1939, as standards for communication among on-board electronic component control modules. This creates a problem for integration of older devices or equipment onto these newer vehicles. Typically, older devices have the ability to communicate only on lower level vehicle bus communication protocols, such as SAE J1708 or SAE J1587, or do not have the ability to communicate on a vehicle bus protocol at all.

While there are other communication devices available to translate among different vehicle bus protocols, they are only modular devices with very limited capabilities that are primarily used for periodic on-board vehicle device status monitoring or vehicle diagnostic purposes only. Not only do they not have the capability to permanently integrate a device into a vehicle bus system, they also do not have any ability to allow for integration of analog signal controlled equipment into a vehicle bus network.

Thus there is a need for a system which has the capabilities and reliability required for permanent integration of an incompatible device into a vehicle bus network. Such a system would allow for the installation of incompatible equipment onto vehicles which was previously not possible.

Numerous innovations for communication devices and methods for communication among different electronic vehicle bus communication protocols have been provided as described below. Even though these innovations may be suitable for the specific purposes to which they address, however, they differ significantly from the present invention.

U.S. Pub. No. 2005/0002417, to Kelly et al., teaches methods and systems for performing protocol conversions in an environment including a work machine having one or more modules coupled to one or more data links. Such methods and systems may leverage one or more gateways to perform tunneling, translating, and bridging operations. Tunneling processes may include receiving a message from a source module in a first protocol, encapsulating the message within transmission units of a second protocol, and transmitting the encapsulated message via the second protocol. Translating processes may include receiving, by the gateway, a message in a first data link protocol including a parameter identifier. The gateway may then provide the scaled parameter data to a module using the second data link protocol, however the present invention does not encapsulate the messages, it translates them using conversion tables and scaling based on the message identifiers as well as Kelly et al. does not teach several other advantages and improvement of the present invention.

U.S. Pat. No. 7,984,225 to McClure et al., teaches methods and systems for providing data communications between a motor vehicle electronic control module network and an RS-232 serial ASCII-text capable device using one or more of a plurality of different protocols. It primarily describes the translation and overall communication among various vehicle control modules and an external device. The present invention is, however, designed to be permanently mounted to the vehicle and McClure et al. does not teach several other advantages and improvement of the present invention.

U.S. Pat. No. 7,684,904 to Wainwright et al., teaches a system and method for facilitating substantially seamless interface among individual component systems for sensor fusion, data exchange, and communication across a broad spectrum of component systems in a vehicle without implicating hardware or software upgrades within individual legacy systems and/or sensors. A universal translator is provided to interface among individual system components that exchange data in a seamless manner among legacy data formats and specific data formats advantageously employed by newly-developed, procured and installed individual component systems.

It is apparent now that numerous innovations for communication among vehicle components have been provided in the prior art that are adequate for various purposes. Furthermore, even though these innovations may be suitable for the specific purposes to which they address, accordingly, they would not be suitable for the purposes of the present invention as heretofore described. Thus a device and method for communication among vehicle components operating on different electronic vehicle bus communication protocols so as to permanently integrate an incompatible vehicle component into the vehicle option is needed.

SUMMARY OF THE INVENTION

The present invention discloses about an intermediate communication device and method for allowing communication among vehicle components operating on different electronic vehicle bus communication protocols.

Typically new vehicles are manufactured using the latest electronic vehicle bus communication protocols, such as SAE J1939, as standards for communication among on-board electronic component control modules. This creates a problem for integration of older devices or equipment in these newer vehicles. Typically, older devices have the ability to communicate only on lower level vehicle bus communication protocols, such as SAE J1708 or J1587, or do not have the ability to communicate on a vehicle bus protocol at all.

The intermediate communication device comprising a microprocessor module assembly, which is connected using a vehicle interface wire harness assembly, among two or more devices on a vehicle which uses a particular vehicle bus protocol for communication among different vehicle control systems. The vehicle interface harness includes one or more connections to vehicle bus communication networks as well as one or more connections to an incompatible device being installed. Once connected, the microprocessor module monitors both the main vehicle bus and the incompatible device bus for data or signals being sent to one another. When the microprocessor module identifies data or signals that are incompatible with a destined device, it will process that data and then rebroadcast it in a compatible format on the applicable bus. When the incompatible device requires an analog signal in lieu of a data message, the processor module will communicate that data message directly to the device using analog communication signals through the vehicle interface harness. The processor module assembly also includes a set of indicator lights. The lights are used to indicate power, data bus activity on each connected data bus, and the status of analog input or output connections. The indicator lights allow for confirmation of proper communication after initial installation as well as a means for troubleshooting communication problems, should any arise after installation.

It is an object of the present invention to provide an intermediate communication device allowing integration of one or more incompatible devices into a vehicle bus network system comprising: a high speed vehicle bus network transceiver to act as an interface among components of the vehicle bus network system; a low speed vehicle bus network transceiver connected to the one or more incompatible devices; a circuit board assembly comprising a microprocessor so as to allow for receiving, processing, translating and rebroadcasting data or signals in a suitable communication protocol format to and from the incompatible devices, wherein the microprocessor monitors vehicle bus data broadcast or signals from the high speed vehicle bus network transceiver as well as the incompatible devices data broadcast or signals from the low speed vehicle bus network transceiver, when the microprocessor identifies signals or data broadcast information destined for the incompatible device, it processes the data and rebroadcasts it to the destined device in a compatible format; vehicle interface harness assembly, wherein the harness assembly allows for physical integration of the circuit board assembly into the vehicle bus network; and a housing for enclosing the circuit board assembly, wherein one or more connectors attached to the housing for removably attaching the circuit board assembly to the vehicle interface harness assembly and one or more indicator lights for indicating connectivity status and allowing on board diagnostics of the integration of the incompatible devices.

It is another object of the present invention to provide a method for integration of one or more incompatible devices associated with a first data link network into a vehicle bus network system associated with a second data link network by an intermediate communication device comprising: connecting the first and the second data link networks to a microprocessor; monitoring the data link networks for a predetermined set of broadcasted parameters by the microprocessor; identifying signals or data broadcast information associated with the parameters that are in incompatible format by the microprocessor; processing the incompatible data associated with the incompatible device by the microprocessor and rebroadcasts it to the destined device in a compatible format; and indicating connectivity status and on board diagnostics of the integration of the incompatible devices.

It is still another object of the present invention to provide an intermediate communication device allowing on board diagnostics of the integration of an incompatible device associated with a first data link network into a vehicle bus network system associated with a second data link network comprising: a digital reader display in the dash that allows a driver to pull fault code information from the incompatible device on the network, wherein the fault code data are broadcast by one or more electronic control modules on the first datalink network to the microprocessor and after receiving the engine fault code data being broadcast over the first data link network, the data are processed by the microprocessor and then rebroadcast to the cab electronic control unit over the second data link network which allows the digital reader to properly display fault coded information from the incompatible device; and one or more indicator lights for indicating connectivity status and allowing on board diagnostics of the integration of the incompatible devices.

It is another object of the present invention to translate among devices which use various vehicle bus protocol standards for communication and devices which have no vehicle bus communication capabilities.

It is further another object of the present invention to translate and downgrade data link messages to analog signals as well as has the ability to translate and upgrade messages from analog signals to data link messages.

Yet another object of the present invention is to allow in addition to communication flowing from the engine control module up to the cab electronic control unit in the dash, a communication flow from the cab electronic control unit down to the engine control module carrying engine control function signals.

Another object of the present invention is its specific design with the capabilities and reliability required for permanent integration of an incompatible device into a vehicle bus network. This allows for installation of incompatible equipment onto vehicles which was previously not possible.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which:

FIG. 1A illustrates permanent integration of an incompatible device into a vehicle bus network by an intermediate communication device;

FIG. 1B illustrates a flow chart of integration of the incompatible device into a vehicle bus network;

FIG. 2A illustrates a front view of the intermediate communication device showing a circuit board assembly and connection points, and FIG. 2B illustrates a front view of the intermediate communication device enclosed in an enclosure box;

Like reference numerals refer to like parts throughout the various views of the drawings.

DETAILED DESCRIPTION OF THE INVENTION

Figure 2A:
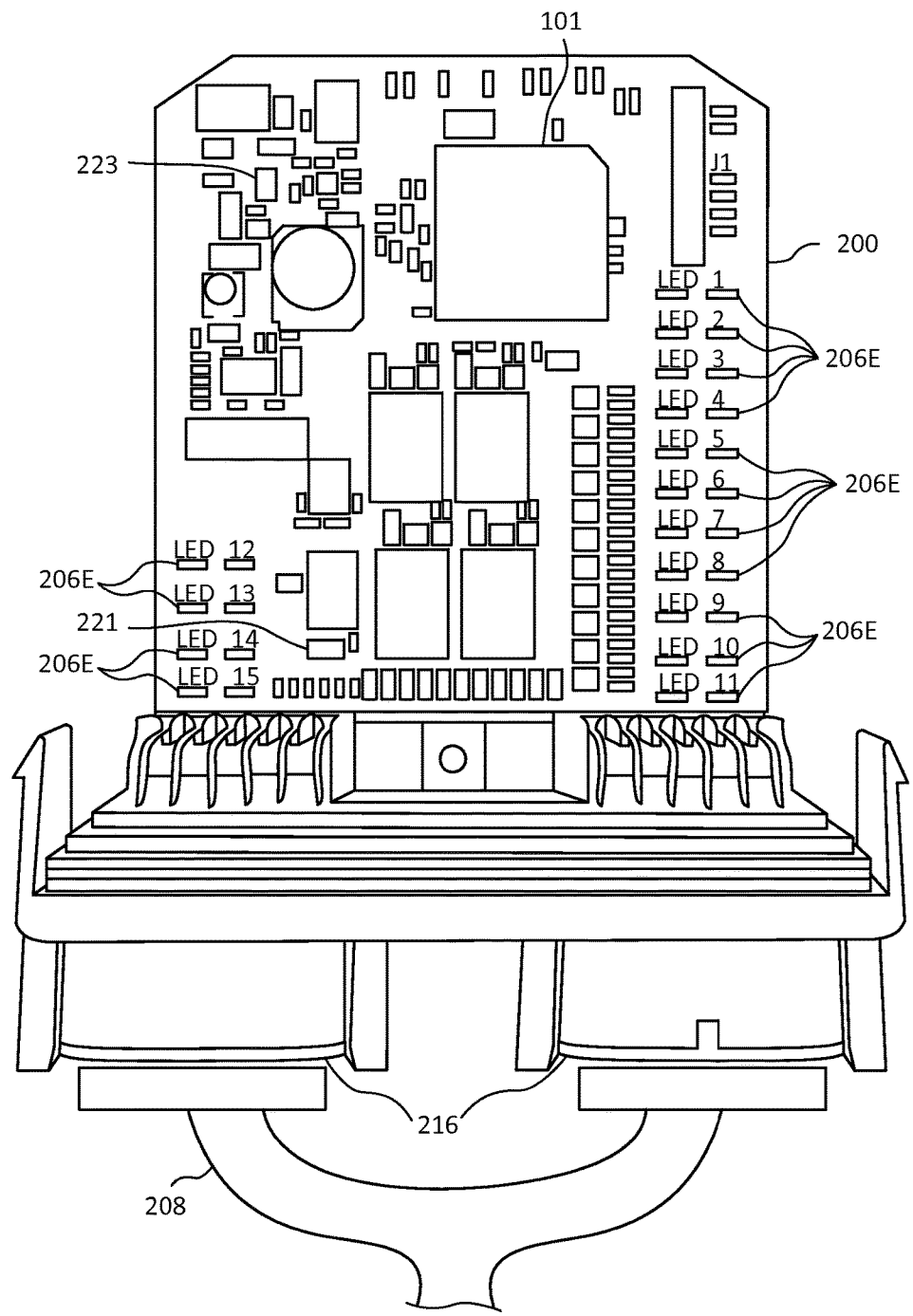
FIGS. 2A and 2B illustrate an exemplary intermediate communication device, where

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1A and 1B. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

In one embodiment of the present invention, referenced in FIG. 1A, an intermediate communication device 100 is specifically designed with the capabilities and reliability required for permanent integration of an incompatible device 102 into a vehicle bus network 104. This allows for installation of incompatible equipment 102 onto vehicles 106 which was previously not possible.

As shown in FIG. 1B, new and advanced vehicles 106 are manufactured using the latest electronic vehicle bus communication protocols 104, such as SAE J1939, as standards for communication among on-board electronic component control module 105. This creates a problem for integration of older devices or equipment 102 in these newer vehicles 106. Typically, older devices 102 only have the ability to communicate on lower level vehicle bus communication protocols 103, such as SAE J1708 or J1587, or do not have the ability to communicate on a vehicle bus protocol at all and use analog signals 107 instead. This invention provides an intermediate communication device 100 which has the ability to process and translate among different vehicle component bus communication protocols (103 and 104). It also has the ability to translate between devices 105 which use various vehicle bus protocol standards 104 for communication and devices 102 which have no vehicle bus communication capabilities and use analog signals 107 for communication instead.

Figure 2B:
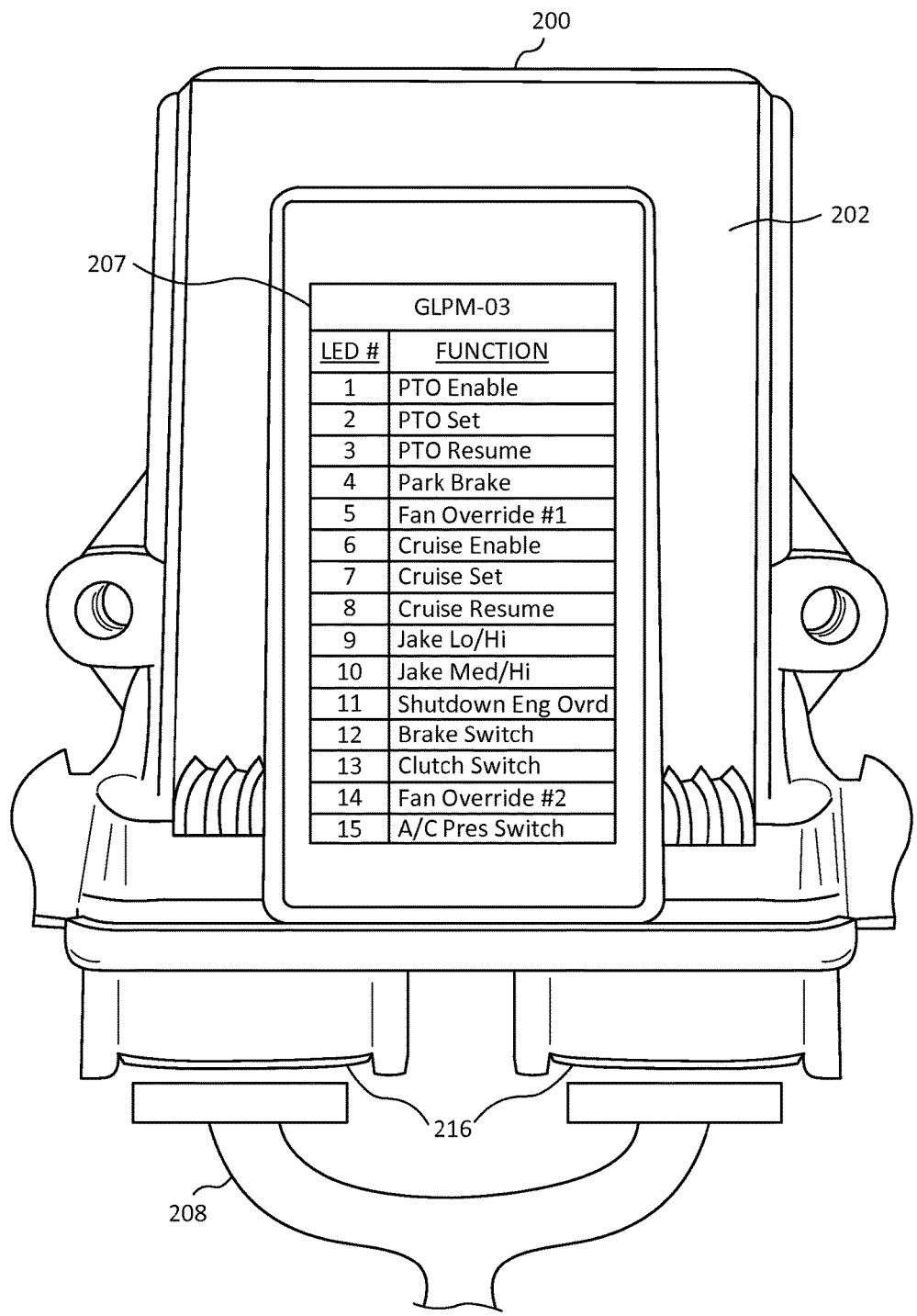

In some embodiments as shown in FIGS. 2A and 2B, the system 100 may include a custom printed circuit board (PCB) assembly 200 contained inside of the enclosure box 202 which includes a microprocessor module 101, indicator lights 206, and indicator light function description 207. The enclosure box 202 of the system 100 includes PCB enclosure header connectors 216 wherein the connectors are 12 pin connectors or the like and are used to attach the device 100 to the vehicle interface harness 208. The connectors facilitate connections including system supply power, ground, data link connections, and analog inputs/outputs.

Figure 3:
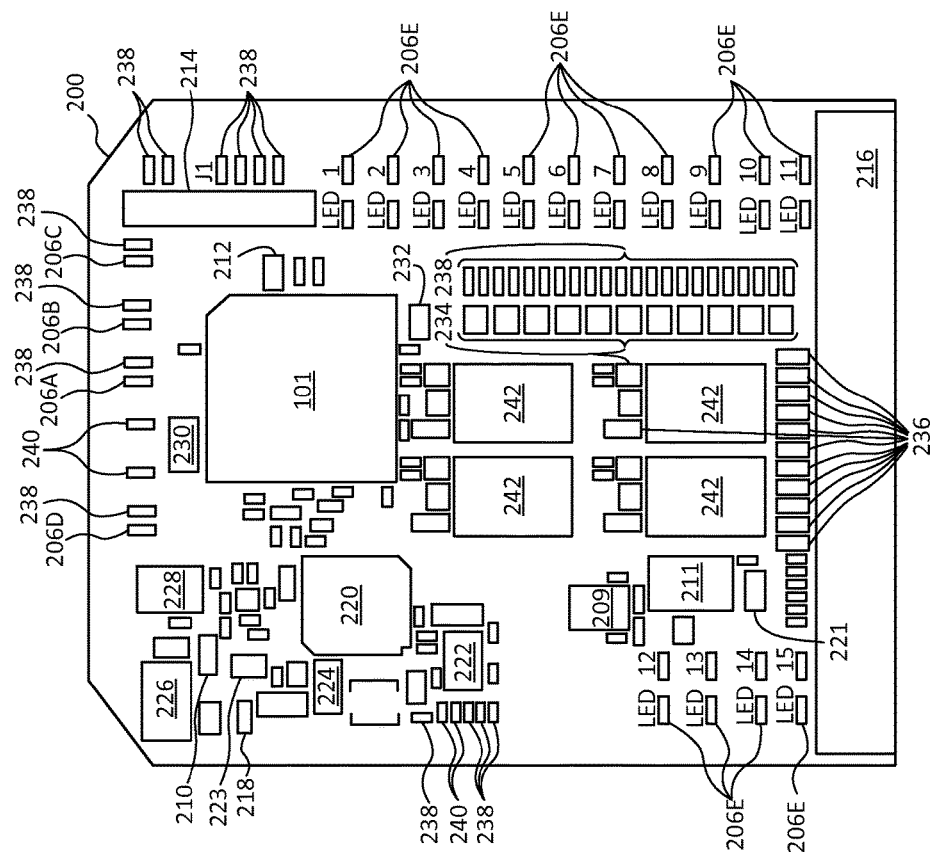
FIG. 3 illustrate various components attached to the circuit board assembly of the intermediate communication device, in accordance with an embodiment of the present invention.

As shown in FIG. 3, the circuit board assembly 200 further comprises main power fuses 218 so as to protect circuit board from short circuits and/or power spikes. Power inductors 220 are used to maintain steady current in the circuit board 200. At least one step down voltage regulator 222 is used to reduce system supply power from chassis system voltage (typically 12 volts) to the proper operating voltage of the circuit board (3.3 volts). At least one transient voltage diode 224 is used to protect the circuit board 200 from voltage spikes within the board 200. A high speed CAN transceiver 223 interfaces to the J1939 datalink network where as a low speed CAN transceiver 221 interfaces to the J1587/J1708 datalink network. Further a low voltage dropout regulator 226 is used to protect the circuit board 200 in the event of low system voltage. A momentary reset switch 228 being a part of the device 100 is used to temporarily interrupt the power supply to the circuit board 200 to reset it. Primarily momentary reset switch 228 is used for programming the device 100. A microprocessor 101 being "the brains" of the board 200 processes, inputs, and directs appropriate outputs whether they are data signals or analog signals. A crystal oscillator 230 associated with the microprocessor 101 acts as a stabilizer for the microprocessor 101.

The circuit board 200 further comprises EEPROM memory 232 which acts as a memory location for software parameters. Several output transistors 234 are used to control the state (open vs. ground) of the output connections. Whereas one or more output protection fuses 236 are used to protect the circuit board 200 from any short circuits or back feeding of voltage through the output connections. The board 200 also contains several resistors 238 which are primarily used for circuit function and circuit protection and several capacitors 240 which are primarily used for reducing noise on the circuits. Several relays 242 are used to configure at least a fan override, A/C fan control, service brake, and clutch as normally closed (grounded) outputs as "true", even when the circuit board is not powered up.

The circuit board 200 further comprises a plurality of LED indicator lights (206A to 206E) that are used for diagnostic purposes as follows: A power LED light 206D illuminates when the board is powered up and stays constantly illuminated to indicate the board is properly powered up. Plurality of output LED lights 206E illuminate to indicate that the corresponding output is GROUNDED. Lights shut off to indicate that the corresponding output is OPEN. A J1587 LED light 206C blinks continuously to indicate databus activity on the J1587/J1708 databus. If there is no connectivity or there is a problem with the data on that bus, the light will not illuminate. A J1939 LED light 206B blinks continuously to indicate databus activity on the J1939 databus. If there is no connectivity or there is a problem with the data on that bus, the light will not illuminate. And a CPU LED light 206A blinks one time to indicate when a switch signal has been received from the CECU.

The circuit board 200 further comprises line driver/receiver transceiver 209, NAND Gate 211, and several header connectors for resistor 210, reset and programming connection point are used, wherein in the header connector for master reset 212, if pins are jumped, it will remove any software loaded into circuit board so as to reset the device. Further the header connector that is used as a main programming connection point is a JTAG Header Connector 214.

The custom printed circuit board assembly 200 must be assembled in a unique configuration which allows the processor module assembly 100 to monitor multiple vehicle bus networks (103 and 104). The circuit board assembly 200 must include the components as shown in FIG. 3 in addition to other required components to allow for receiving, processing, and rebroadcasting data or signals in a different communication protocol format (103 and 104) to and from an incompatible device 102. This also requires a vehicle connection wire harness assembly 208 to allow for physical integration of the processor module assembly 100 onto a vehicle bus network 104.

As shown in FIGS. 1A, 1B, 2A, 2B, 3, and 5, the device 100 is connected, using a vehicle interface wire harness assembly 208. The vehicle connection harness 208 is used to interface an original equipment manufacturers (OEMs) vehicle bus network 104 so as to connect among two or more devices on a vehicle 106. The vehicle 106 which uses the particular vehicle bus protocol 104 for communication among different vehicle control systems (501 thru 516). The vehicle interface harness 208 includes one or more connections to vehicle bus communication network 104 as well as one or more connections (103 and 107) to an incompatible device 102 being installed. Once connected, the processor module assembly 100 monitors both the main vehicle bus 104 and the incompatible device bus 103 for data or analog signals 107 being sent to one another. When the processor module assembly 100 identifies data or signals that are incompatible with a destined device (102 or 105), it will process that data and then rebroadcast it in a compatible format on the applicable bus. When the incompatible device 102 requires an analog signal 107 in lieu of a data message, the processor module assembly 100 will communicate that data message directly to the device 102 using analog communication signals 107 through the vehicle interface harness 208. The processor module assembly 100 also includes a set of indicator lights 206. The lights 206 are used to indicate power, data bus activity on each connected data bus (103 and 104), and the status of analog input or output connections. The indicator lights 206 allow for confirmation of proper communication after initial installation as well as a means for troubleshooting communication problems, should any arise after installation.

Figure 4:
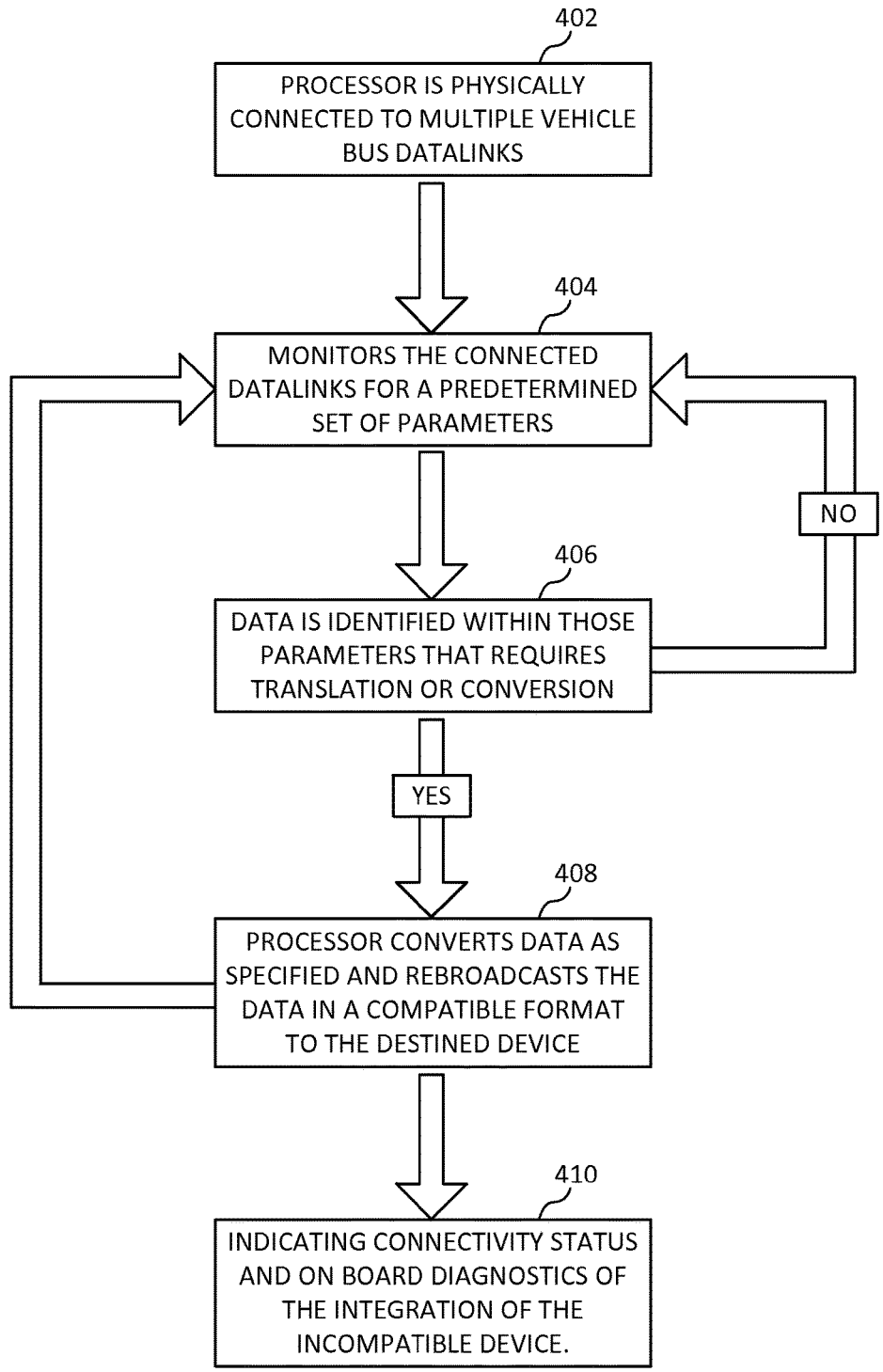
FIG. 4 illustrates a flow chart showing a basic process in accordance with an embodiment of the present invention.

In another embodiments of the invention as shown in FIG. 4 which illustrates a method for integration of one or more incompatible devices associated with a first data link network into a vehicle bus network system associated with a second data link network by an intermediate communication device comprising: connecting the first and the second data link networks to a microprocessor as shown in step 402; monitoring the data link networks for a predetermined set of broadcasted parameters by the microprocessor as illustrated in step 404; identifying signals or data broadcast information associated with the parameters that are in incompatible format by the microprocessor as depicted in step 406; processing the incompatible data associated with the incompatible device by the microprocessor and rebroadcasts it to the destined device in a compatible format as shown in step 408; and indicating connectivity status and on board diagnostics of the integration of the incompatible devices as shown in step 410.

Figure 5:
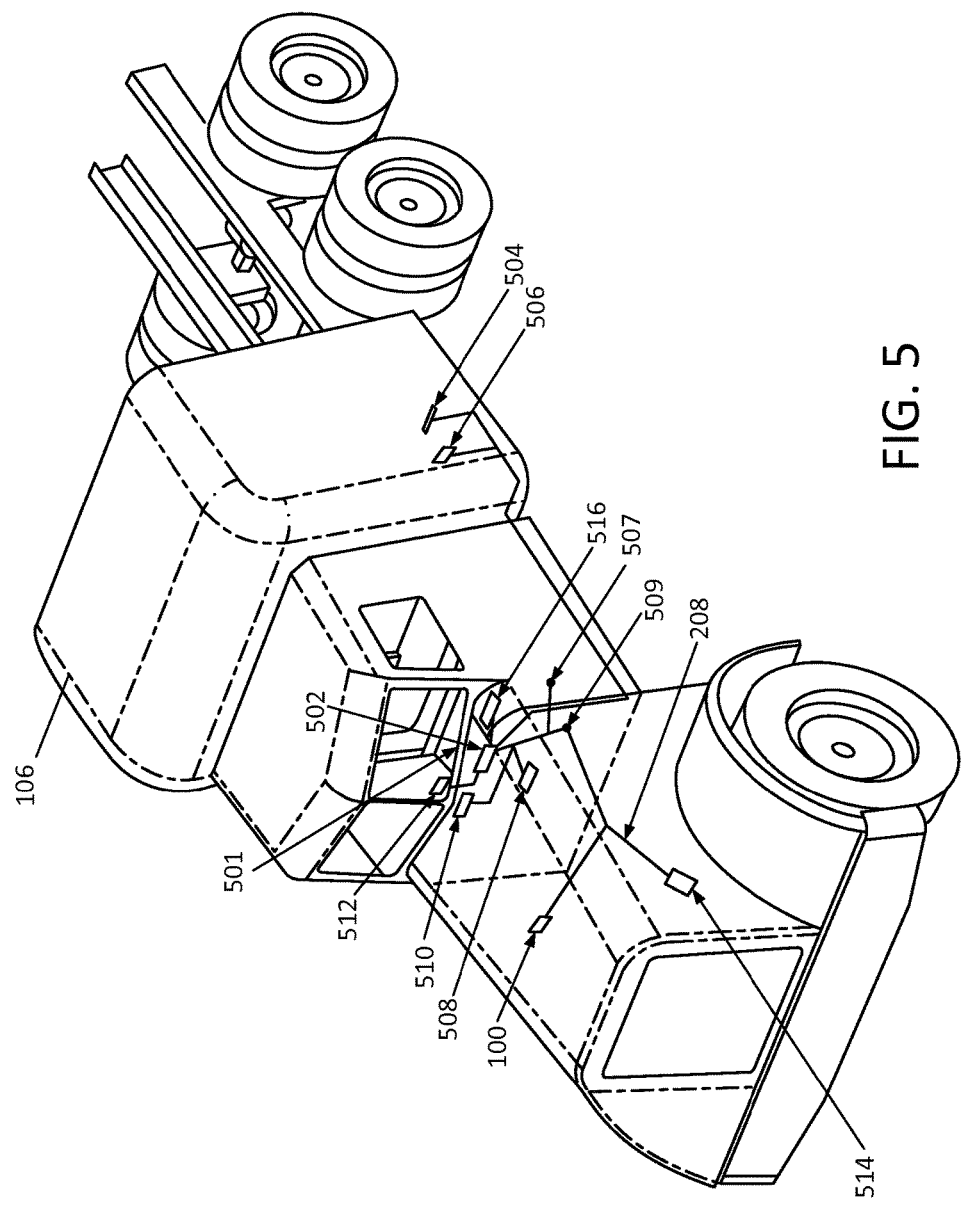
FIG. 5 illustrates a schematic diagram of an exemplary arrangement of the intermediate communication device allowing permanent integration of an early generation electronic engine component into a new current production chassis of a heavy duty truck.

In some exemplary embodiments of the invention as shown in FIG. 5, the intermediate communication device 100 allows for installation of an early generation electronic engine 102 (FIG. 1A) into a new current production chassis of a heavy duty truck 106. The early generation electronic engine referred to the engine or engine components that are manufactured between the years 1994 to 2004. Because of the electronic structure of the new current production chassis 106, which utilize a vehicle bus 104 (FIG. 1A) for communication among all on board electronic devices, the installation of the early generation electronic engine 102 is not possible without the intermediate communication device 100. The new heavy duty truck chassis 106 have various electronic control modules (501 thru 516) which communicate with each other over the SAE J1939 vehicle bus datalink 104. The various electronic control modules include but are not limited to modules such as a Cab Electronic Control Unit (CECU) 502, a Chassis Node 504, body controller 506, an Antilock Brake System (ABS) controller 508, a Transmission Control Unit (TCU) 510, switch cluster 512, instrument cluster 516 and an Engine Control Module (ECM) 514.

Most heavy duty trucks 106 today have multiplexed electronic dash structures 501 which utilize digital gauges that are driven off of a proprietary CAN bus connection with the CECU 502. All of the engine related gauges require data from the engine ECM 514 in order to function. In a standard installation with a current production engine, the data are broadcast by the engine ECM 514 to the CECU 502 over the J1939 datalink network. The CECU 502 in the cab then receives the J1939 data from the engine and then rebroadcasts them to the destined digital gauge over the proprietary CAN bus network 104. The problem with trying to install an early generation electronic engine is that the early generation ECMs typically do not have the communication capabilities required to communicate with the other modules on the J1939 datalink network 104. The early generation engine ECMs 514 do, however, broadcast the gauge data, but do so over a different SAE datalink network (J1587) 103 (not shown in the FIG. 5) which is not compatible with the CECU 502 in the cab. One of the capabilities of the current invention is to receive the gauge data being broadcast over the J1587 datalink 103, process that data, and then rebroadcast them to the CECU 502 over the J1939 datalink network 104 instead. This allows the CECU 502 to receive the data it requires in a compatible format in order to run the engine related gauges.

Another function of the current production multiplex dash structure 501 is to allow for On Board Diagnostics (OBD) monitoring of the various modules operating on the J1939 vehicle bus network 104. FIG. 5 also shows a diagnostic connector 507 for connection of an external computer to monitor diagnostics externally and firewall pass through connector 509 assisting in proper connection of the vehicle interface harness 208 to the cab. There is typically a digital reader display in the dash 501 that allows the driver the ability to pull fault code information from any module on the network (501 thru 516) that is having problems. Much like the gauge information discussed earlier, in a standard installation fault code data are broadcast by the engine ECM 514 to the CECU 502 over the J1939 datalink network 104 which the CECU 502 ultimately displays to the driver in the digital reader display of the dash structures 501. Again, in the case of an installation of an early generation electronic engine 102, these data are not available from the engine ECM 514 on J1939, but are available on the J1587 datalink 103 broadcast. Another capability of the current invention is to receive the engine fault code data being broadcast over the J1587 datalink 103, process that data, and then rebroadcast to the CECU 502 over the J1939 datalink network 104 instead. This allows the CECU 502 to receive the data it requires in a compatible format in order to properly display the engine fault code information in the case of a problem.

In addition to communication flowing from the engine ECM 514 up to the CECU 502 in the dash 501, there is also communication flow required from the CECU 502 down to the engine ECM 514. This communication would typically include but is not limited to engine control function signals such as cruise control request, engine brake/retarder request, manual fan request, diagnostic request, shutdown engine override request, service brake status, park brake status, and clutch switch status. In a standard installation with a current production engine, these signals would originate at switch 512. When activated, the switch 512 will send a signal, either via analog signal or via data signal, to the CECU 502. The CECU 502 will then generate a J1939 signal and then broadcast that signal to the engine ECM 514 over the J1939 datalink network 104. The ECM 514 will receive the J1939 signal and then respond accordingly. In the case of installing an early generation electronic engine, they do not have the communication capabilities required to receive a J1939 engine control function signal. Instead, the early generation electronic engines are typically only designed to receive analog signal inputs 107. Another capability of the current invention is to receive J1939 engine control function signals from the CECU 502, process those data signals, and in turn send out an analog signal 107 to the engine that will be compatible with its ECM requirements.

The ABS module 508 also requires communication with the engine ECM 514. Again, this communication is being done over the J1939 datalink network 104 in a standard installation with a current production engine. In a typical installation, the ABS controller 508 will send out an initialization request to the engine ECM 514 on the J1939 datalink network 104 requesting status of several engine parameters such as cruise control status, engine brake status, retarder control status, engine speed, etc. The engine will in turn provide a response message to the ABS controller 508 over the J1939 datalink network 104 with the requested information. Also, in certain antilock brake situations the ABS controller 508 will send an override request to the engine ECM 514 over the J1939 datalink network 104 to do things such as change engine speed, change engine torque, enable/disable engine brakes, etc. In the case of installing an early generation electronic engine 102, it does not have the communication capabilities required to receive a J1939 request signal from or send a J1939 response signal to the ABS controller 508. Instead, the early generation electronic engines are typically only designed to communicate with an ABS controller 508 over the J1587 or J1922 datalink networks 103. Another capability of the current invention is to receive J1939 request signals from the ABS controller 508, process those data signals, and then rebroadcast those request signals over the J1587 or J1922 datalink network 103 to the ECM 514. This allows the engine ECM 514 to receive the data it requires in a compatible format in order to properly process and respond to a request from the ABS controller 508. Once the request is properly received by the ECM 514, it will then broadcast a response back to the ABS controller 508 over the J1587 or J1922 datalink network 103. Because the J1587 or J1922 response signal would not be compatible with the ABS controller 508, the current invention also has the capability to receive J1587 or J1922 response signals from the engine ECM 514, process those data signals, and then rebroadcast those signals over the J1939 datalink network 104 to the ABS controller 508. This allows the ABS controller 508 to receive the data it requires in a compatible format in order to properly communicate with an engine ECM 514.

One of the critical engine monitoring functions on a heavy duty truck chassis 106 is the coolant level monitoring sensor. The sensor is installed in the overflow tank and is designed to send a warning signal to the engine ECM 514 when the coolant level is low. There is a large disparity in the logic between the low coolant level sensor for an older generation electronic engine 102 and the ones used on a current production chassis 106. Another feature of the current invention is to bridge that disparity gap in logic. The coolant level sensor logic of an early generation electronic engine is that of a simple ground and open circuit switch type structure. Whereas the coolant level sensors used in the current production chassis 106 are a true resistance sensor that varies the resistance or output voltage depending on the state of the coolant. The current invention is able to bridge that gap by monitoring the resistance or input voltage with a specific set of trip points and then applying the appropriate output signal to the engine ECM 514 based on the resistance or input voltage level.

This is just one example of a specific installation, but the invention is not limited to this installation. The same logic would apply to various other installations as well.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An intermediate communication device allowing integration of and functional interdependence between one or more permanently-integrated on-board comparatively older incompatible devices into a comparatively newer on-board vehicle bus network system comprising:

an on-board high speed vehicle bus network transceiver to act as an interface among permanently-integrated on-board comparatively newer components of the vehicle bus network system, the permanently-integrated on-board comparatively newer components of the vehicle bus network system required for vehicle functionality;

an on-board low speed vehicle bus network transceiver connected to the one or more permanently-integrated on-board comparatively older incompatible devices, the one or more permanently-integrated on-board comparatively older incompatible devices required for vehicle functionality;

an on-board circuit board assembly comprising a microprocessor so as to allow for receiving, processing, translating and rebroadcasting data or signals in a suitable communication protocol format to and from the permanently-integrated on-board comparatively older incompatible devices, wherein the microprocessor monitors vehicle bus data broadcast or signals from the high speed vehicle bus network transceiver as well as the permanently-integrated on-board comparatively older incompatible devices data broadcast or signals from the low speed vehicle bus network transceiver, when the microprocessor identifies signals or data broadcast information destined for the permanently-integrated on-board comparatively older incompatible devices, it processes the data and rebroadcasts it to permanently-integrated on-board destined comparatively older incompatible devices in a compatible format;

an on-board vehicle interface harness assembly, wherein the harness assembly allows for permanent physical integration of the circuit board assembly onto the vehicle bus network, the vehicle interface harness assembly including at least one first connection to the comparatively newer vehicle bus network system and at least one second connection to the one or more permanently-integrated on-board comparatively older incompatible devices and the circuit board assembly monitors both the comparatively newer vehicle bus network system and the one or more permanently-integrated on-board comparatively older incompatible devices for data or analog signals being sent to one another once the at least one first connection is connected to the at least one second connection; and an on-board housing for enclosing the circuit board assembly, wherein one or more connectors attached to the housing for removably attaching the circuit board assembly to the vehicle interface harness assembly and one or more indicator lights for indicating connectivity status and allowing on board diagnostics of integration of the permanently-integrated on-board comparatively older incompatible devices.

2. The intermediate communication device of claim 1, wherein the high speed vehicle bus network transceiver is an interface transceiver to J1939 data link network.

3. The intermediate communication device of claim 1, wherein the low speed vehicle bus network transceiver is an interface transceiver to J1587 or J1708 or J1922 data link network.

4. The intermediate communication device of claim 1, wherein the indicator lights are used to indicate power, vehicle bus activity, status of analog input/output connections and indicate receipt of the data broadcasts or the signals by the permanently-integrated on-board comparatively older incompatible devices.

5. The intermediate communication device of claim 1, wherein the microprocessor has the ability to translate and upgrade messages from analog signals to data link messages.

6. The intermediate communication device of claim 1, wherein the microprocessor has the ability to translate and downgrade data link messages to analog signals.

7. A method for integration of and functional interdependence between one or more permanently-integrated on-board comparatively older incompatible devices including at least one engine control module required for vehicle functionality and associated with a first data link network into an on-board comparatively newer vehicle bus network system including at least one cab electronic control unit required for vehicle functionality and associated with a second data link network by an intermediate communication device comprising:

connecting the first and the second data link networks to an on-board microprocessor via an on-board vehicle interface harness assembly, the vehicle interface harness assembly including at least one first connection to the comparatively newer vehicle bus network system and at least one second connection to the one or more permanently-integrated on-board comparatively older incompatible devices;

monitoring the data link networks for a predetermined set of broadcasted parameters by the microprocessor once the at least one first connection is connected to the at least one second connection of the vehicle interface harness assembly;

identifying signals or data broadcast information associated with the parameters that are in incompatible format by the microprocessor;

processing the signals or data broadcast information associated with one of the permanently-integrated on-board comparatively older incompatible devices by the microprocessor and rebroadcasts it to or from a destined one of the permanently-integrated on-board incompatible comparatively older devices in a compatible format; and indicating connectivity status and on board diagnostics of integration of the permanently-integrated on-board comparatively older incompatible devices.

8. The method of claim 7, wherein the first datalink network is a J1587 or J1708 or J1922 datalink network.

9. The method of claim 7, wherein the second datalink network is a J1939 datalink network.

10. The method of claim 7, wherein the indicator lights are used to indicate connectivity status and on board diagnostics such as to indicate power, vehicle bus activity, status of analog input/output connections and indicate receipt of the signals or data broadcast information by the destined one of the permanently-integrated on-board comparatively older incompatible devices.

11. The method of claim 7, wherein the microprocessor has the ability to translate and upgrade messages from analog signals to data link messages.

12. The method of claim 7, wherein the microprocessor has the ability to translate and downgrade data link messages to analog signals.

13. An intermediate communication device allowing on board diagnostics of, integration of and functional interdependence between at least one permanently-integrated on-board comparatively older incompatible engine control module required for vehicle functionality and associated with a first datalink network into an on-board comparatively newer vehicle bus network system including a cab electronic control unit required for vehicle functionality and associated with a second datalink network comprising:

an on-board vehicle interface harness assembly, wherein the harness assembly allows for permanent physical integration of the comparatively newer vehicle bus network system with the comparatively older incompatible engine control module, the vehicle interface harness assembly including at least one first connection to the comparatively newer vehicle bus network system and at least one second connection to the comparatively older incompatible engine control module and a microprocessor monitors both the comparatively newer vehicle bus network system and the one or more permanently-integrated on-board comparatively older incompatible engine control module for data or analog signals being sent to one another once the at least one first connection is connected to the at least one second connection;

an on-board digital reader display in a dash structure that allows a driver to pull fault code information from the at least one permanently-integrated on-board comparatively older incompatible engine control module on the network, wherein the fault code information are broadcast by the at least one engine control module on the first datalink network to the microprocessor and receiving the engine fault code information being broadcast over the first datalink network the data are processed by the microprocessor and then rebroadcast to the cab electronic control unit over the second datalink network which allows the digital reader to properly display fault coded information from the permanently-integrated on-board comparatively older incompatible engine control module; and one or more on-board indicator lights for indicating connectivity status and allowing on board diagnostics of integration of the permanently-integrated on-board comparatively older incompatible engine control module.

14. The intermediate communication device of claim 13, wherein the first data link network is a J1587 or J1708 or J1922 data link network.

15. The intermediate communication device of claim 13, wherein the second data link network is a J1939 data link network.

16. The intermediate communication device of claim 13, wherein the indicator lights are used to indicate power, vehicle bus activity, status of analog input/output connections and indicate receipt of the data broadcasts or the signals by the permanently-integrated on-board comparatively older incompatible engine control module.

17. The intermediate communication device of claim 13, wherein the microprocessor has the ability to translate and upgrade messages from analog signals to data link messages.

18. The intermediate communication device of claim 13, wherein the microprocessor has the ability to translate and downgrade data link messages to analog signals.

19. The intermediate communication device of claim 13, wherein the device also allows in addition to communication flowing from the engine control module up to the cab electronic control unit in the dash structure, communication flow from the cab electronic control unit down to the engine control module carrying engine control function signals such as cruise control request, engine brake request, manual fan request, diagnostic request, shutdown engine override request, service brake status, park brake status, and clutch switch status.

* * * * *